United States Patent [19]

Finley

[11] Patent Number: 5,287,004
[45] Date of Patent: Feb. 15, 1994

[54] AUTOMOBILE AIR AND GROUND EFFECTS POWER PACKAGE

[76] Inventor: Michael D. Finley, 26739 Isabella Pkwy. #203, Canyon Country, Calif. 91351

[21] Appl. No.: 941,207

[22] Filed: Sep. 4, 1992

[51] Int. Cl.$^5$ .......................... B60L 8/00; F03D 3/04; F03D 9/00
[52] U.S. Cl. ...................... 290/55; 180/2.2; 180/65.3; 290/44
[58] Field of Search ..................... 290/44, 55; 180/2.2, 180/65.3

[56] References Cited

U.S. PATENT DOCUMENTS

| | | | |
|---|---|---|---|
| 1,903,307 | 4/1933 | Gillio | 290/55 |
| 3,878,913 | 4/1975 | Lionts et al. | 290/44 |
| 4,141,425 | 2/1979 | Treat | 290/55 |
| 4,632,205 | 12/1986 | Lewis | 290/55 |

FOREIGN PATENT DOCUMENTS

| | | | |
|---|---|---|---|
| 3226381 | 1/1984 | Fed. Rep. of Germany | 290/55 |
| 22578 | 10/1907 | United Kingdom | 290/55 |

*Primary Examiner*—Jeffrey A. Gaffin
*Assistant Examiner*—Robert Lloyd Hoover

[57] ABSTRACT

This invention consists of two parts, an air dam attached to the lower front end of a motor vehicle and a spoiler attached to the upper rear end of the vehicle, with rotors and generators integrated into each of these parts. The rotors have horizontal axes and fixed blades running the length of the axes and extending symmetrically no more than a few inches from the axes, each blade being curved in the same direction. Two electric generators are attached to each rotor by short rods at both ends. Air current passing around the vehicle turns the rotors and generates electricity, while the air dam and spoiler counteract the drag created by the rotors and improve the overall drag coefficient of the vehicle.

3 Claims, 3 Drawing Sheets

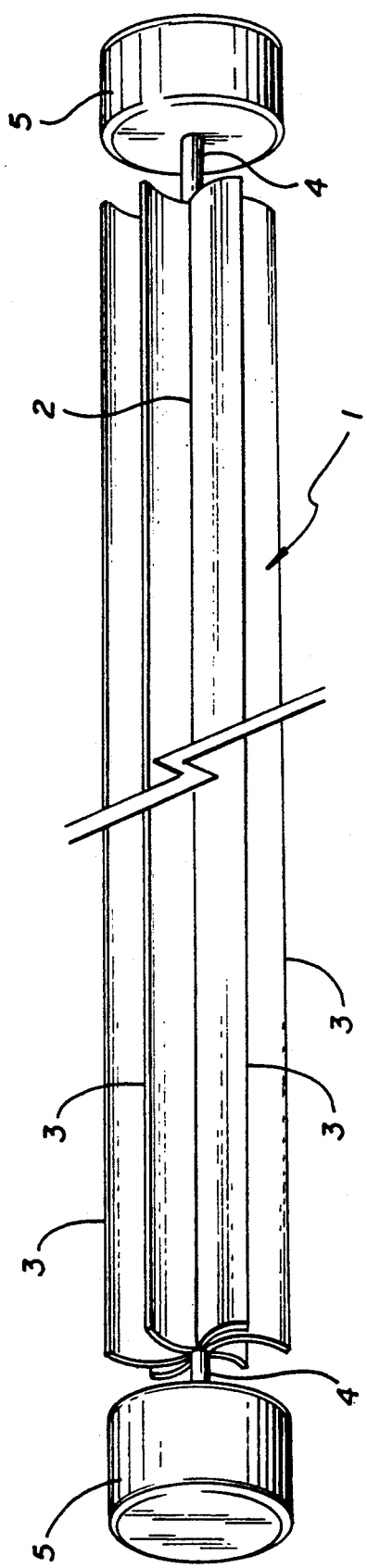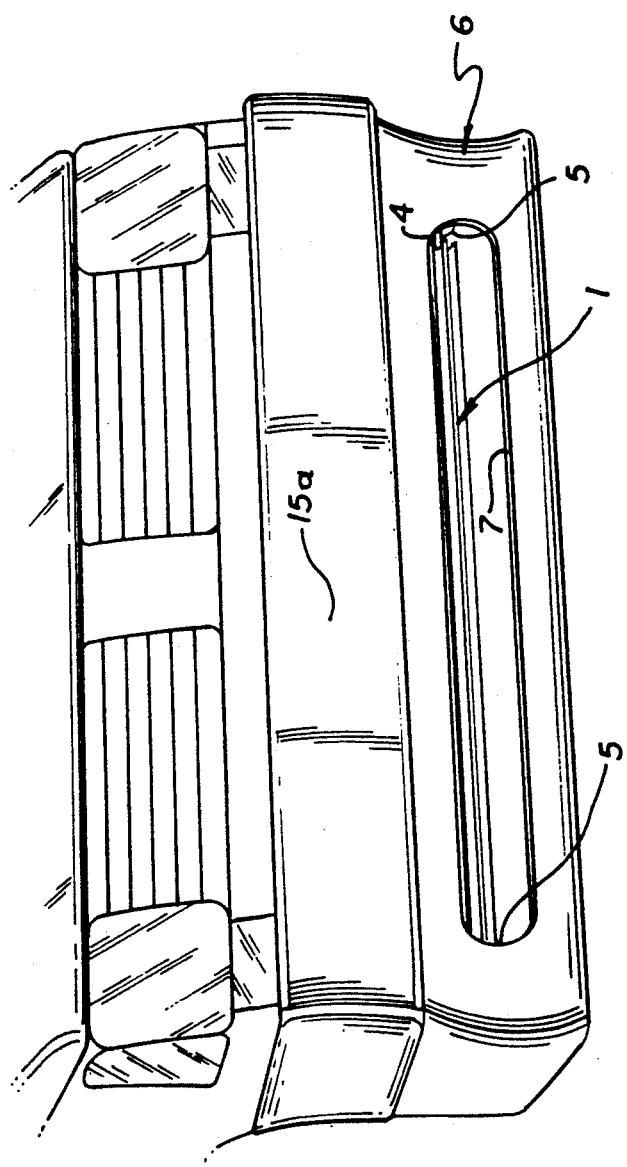

1

AUTOMOBILE AIR AND GROUND EFFECTS POWER PACKAGE

BACKGROUND OF THE INVENTION

1. Field of the Invention

The present invention relates to and combines the fields of generation of electricity by force of wind, automobile aerodynamics parts/accessories, and automobile electrical generation parts. This invention creates a new field of automobile aerodynamics electrical generation parts utilizing the power of wind or air rushing over and around the vehicle.

2. Description of Related Art Including

The use of wind power to generate electricity has heretofore been relegated to stationary windmills of the horizontal axis (propeller) or vertical axis (Darrieus "eggbeater" rotor, and Savonius "S" rotor) types, the former being the most efficient. While vertical axis Magnus Effect rotors have been used to propel "sail" boats, the generation of electricity by force of wind on a moving vehicle has not been feasible prior to this invention.

As fossil fuel prices are rising and many states are mandating the production and sale of zero-emissions vehicles, many automobile manufactures are experimenting with electric vehicles and the inexpensive recharging of the batteries of said vehicles to extend their currently limited ranges. Most advances have been made in the field of photovoltaic (solar) cells. General Motors uses generators to help slow its "Impact" electric concept car when the driver removes his foot from the accelerator.

But the abundance of "wind" energy flowing over a moving vehicle has remained unharnessed. This is due to the fact that, prior to this invention, the drag created by wind-capturing devices has been greater than the electricity generated, resulting in a negative, rather than a positive, electrical flow. Most, if not all, such unsuccessful attempts have been made using propeller-type rotors, which rotate at right angles to the air flow.

The devices most commonly used to reduced a vehicles' drag coefficient, i.e., air dams/scoops and rear spoilers, have not been capable of harnessing wind energy.

The closest prior art to the present invention consists of the vertical-axis Savonius rotor windmill and the wide variety of vehicle air dams and spoilers. These concepts are altered and combined in the present invention.

SUMMARY OF THE INVENTION

The present invention allows positive generation of electricity on a vehicle using the force of air or wind flowing over and around the vehicle. A low-drag horizontal-axis rotor more closely related to the vehicle-axis Savonius rotor windmill than to propeller-type rotors is incorporated into an air dam and rear spoiler. The rotor achieves a low drag co-efficient by "rolling" in the direction of the flow of air rather than spinning at right angles to the air flow like a propeller-type rotor. The wind-driven rotor replaces the flywheel of the generators/alternators attached to each end thereof, which is the only improvement to present generator/alternator technology. The anti-drag effect of the air dam and rear spoiler counter-act the already low drag of the rotor, resulting in a positive flow of electricity which can be used to recharge the batteries of electric or other low-emission vehicles or provide power for gasoline-powered vehicle accessories, such as air-conditioners or radios, increasing the mileage or range of the vehicle.

Improvements on the Savonius "S" Rotor

The large size, vertical axis, single generator, and dual blades of the Savonius "S" rotor windmill are somewhat efficient for the stationary generation of electricity by wind. However, these characteristics are all completely inefficient for wind-powered electrical generation on a moving vehicle, where a low drag co-efficient is essential.

A vehicle-based "windmill" must be as small as possible and must blend with the body of the vehicle. Therefore a horizontal axis is to be preferred to a vertical-axis system protruding upward like a mast. As a rotor placed on its side must be supported at each end, dual generators are not only ideal, but mandatory. Also, the low surface area of the midget-sized rotor blades necessitates the use of additional blades, preferably five or six, to increase surface area for maximum wind contact.

These improvements would not be indicated on a stationary windmill. In fact, the Savonius "S" rotor design has remained virtually unchanged for an incredibly long time due to the superior efficiency and potential of propeller-type rotors for stationary wind-electrical generation. Consequently, most advances in stationary windmill technology have been concentrated on propeller-type systems.

BRIEF DESCRIPTION OF THE DRAWINGS

FIG. 2 is a perspective view of the rotor, dubbed the "Finley rotor."

FIG. 3 is a perspective view of the front air dam/scoop portion of the invention.

DESCRIPTION OF THE PREFERRED EMBODIMENTS

Figure 1:
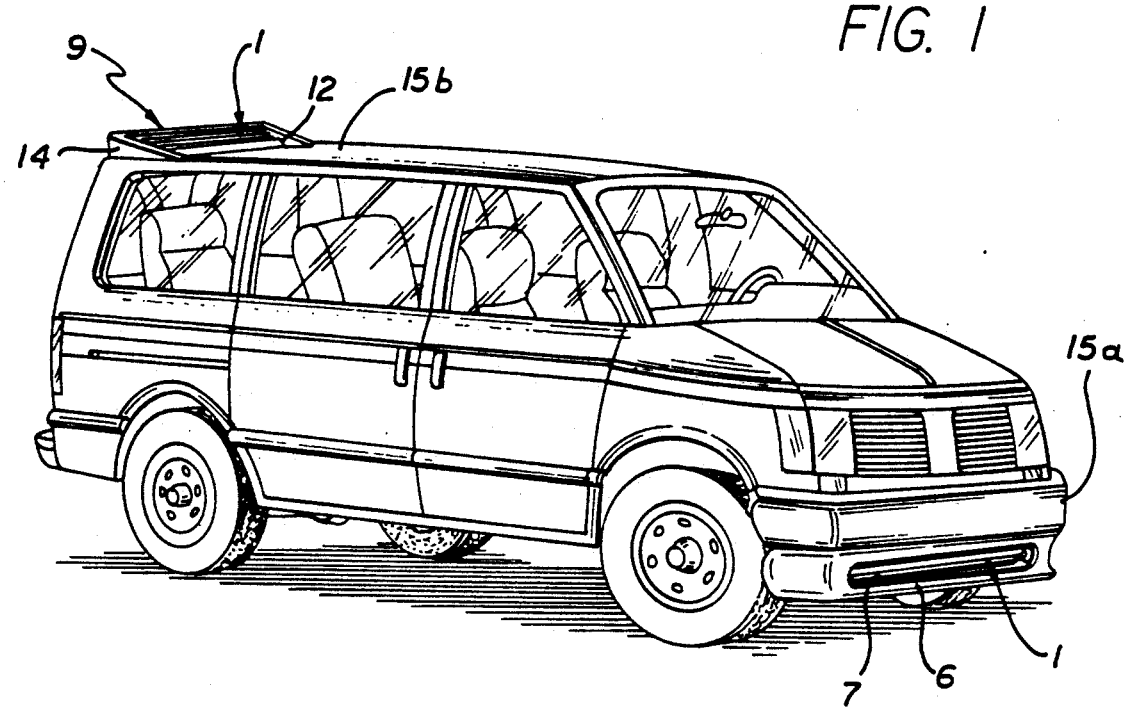
FIG. 1 is a perspective view showing the location of the invention on a typical passenger vehicle.

Referring to FIG. 1 the invention consists of a horizontal-axis curved-blade rotor (referred to hereinafter as the "Finley rotor") 1 embedded within an air dam 6 attached to the lower front end of a vehicle 15a and another Finley rotor 1 embedded within a spoiler 9 attached to the upper rear end of the vehicle 15b, with portions of the Finley rotors exposed to air or wind passing over and around the vehicle.

In FIG. 2 the Finley rotor 1 is illustrated. The Finley rotor 1 is based on a horizontal axis 2 which extends much of the way across the width of the vehicle. The several rotor blades 3 run nearly the entire length of the axis 2, extending outward from the axis 2 only a short distance. The blades 3 are curved against the direction of the flow of air or wind over and around the vehicle. Small, short rods 4 extend from the ends of the rotor 1 at the axis 2. The rotor 1 as a whole has the appearance almost of a slender horizontal cylinder, except that the blades 3 are separate from each other and only touch at the axis 2. The Finley rotor 1 must be as light as possible, yey strong enough to remain rigid when spun by combined vehicle speed and wind forces of 100 miles per hour or more, must be weather resistant, and must not conduct electricity. Therefore the recommended materials for the Finley rotor 1 are either a laminate or a high-tech plastic. The Finley rotor 1 is attached at each rod at the ends 4 to a generator or alternator 5 of the appropriate voltage for the vehicle. (While internal-combustion vehicles are mostly 12 volt, the voltage for electric or other low-emission vehicles is not yet standard and currently varies greatly). The flywheels of the generators/alternators 5 are, in effect, replaced by the Finley rotor 1. The generators/alternators 5 are hidden within the front air dam and rear spoiler (not shown in this Figure). The generators/alternators 5 must also be light in weight but strong, and similar materials are recommended for the housings thereof.

Figure 4:
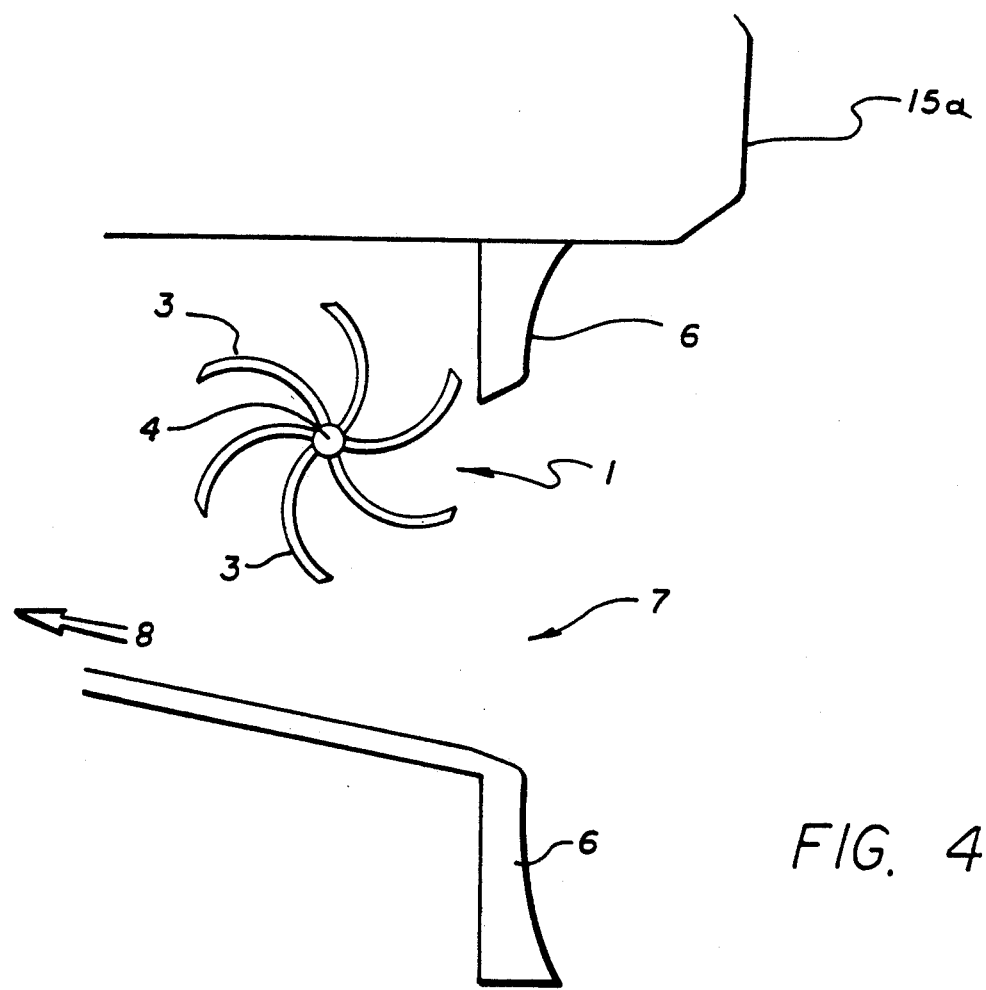
FIG. 4 is a side elevation of the front air dam/scoop portion of the invention.

The front air dam/scoop 6 portion of the invention (FIGS. 3 & 4) is based on a typical air dam 6 extending downward from the front end of the vehicle 15a to reduce the flow of drag-producing air under the vehicle. An open, horizontal, slot-like "air scoop" 7 near the top of the air dam 6 directs air flow to cool the engine and/or vent the passenger compartment 8. A Finley rotor 1 is embedded within the air dam 6, with a portion thereof exposed to air/wind flowing through the "scoop" 7. The generators/alternators 5 (not shown in FIG. 4) attached to the ends of the Finley rotor 1 are hidden within the air dam 6. These must be attached to the vehicle 15a very securely as the force of air/wind turning the Finley rotor 1 will be great. Air dams 6 are typically made of durable but light plastics, which materials would be suitable for the air dam/scoop 6 portion of this invention.

Figure 5:
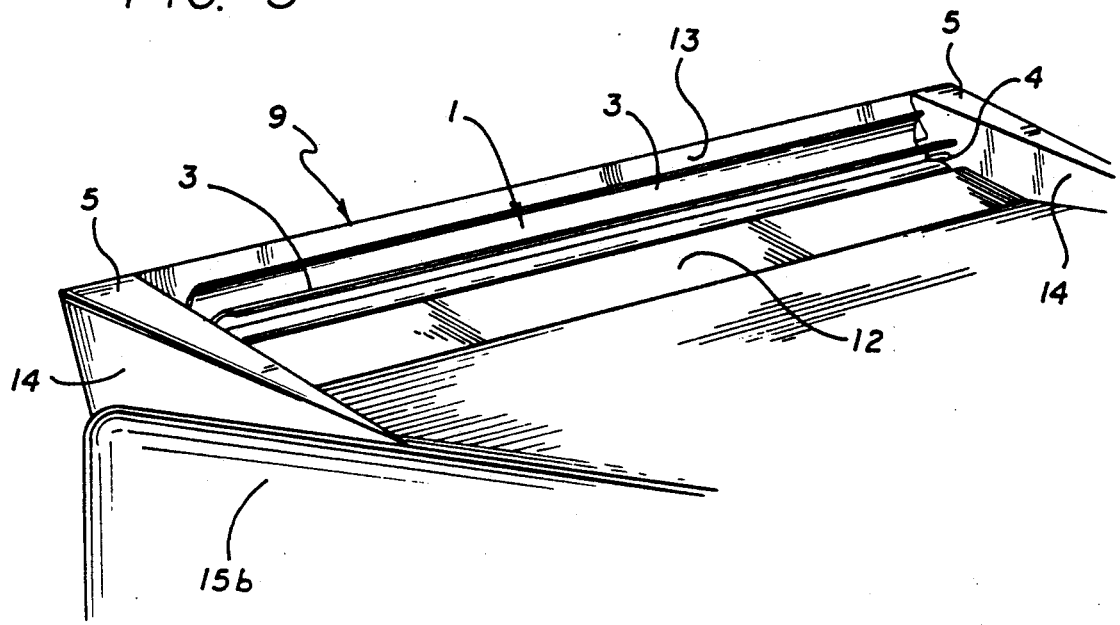
FIG. 5 is a perspective view of the rear spoiler portion of the invention.
Figure 6:
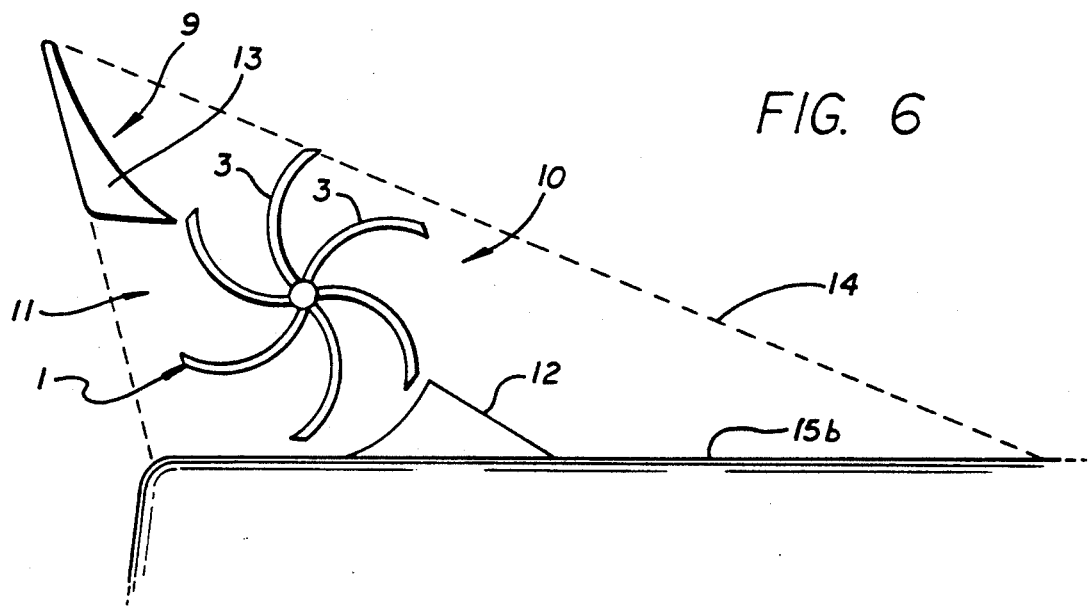
FIG. 6 is a side elevation of the rear spoiler portion of the invention.

As shown in FIGS. 5 & 6 the rear spoiler 9 portion of the invention consists of a Finley rotor 1 horizontally embedded within a typical spoiler unit 9 attached to the upper rear trailing edge of the vehicle 15b. Portions of the Finley rotor 1 are exposed to the flow of air/wind at the upper front 10 and lower rear 11 of the spoiler unit 9. A small ramp 12 at the bottom front of the spoiler unit 9 directs the flow of air/wind upward into the curved blades 3 of the Finley rotor 1. The actual spoiler portion (or "lip") 13 of the unit is located at the upper rear behind the Finley rotor 1 and is angled upward away from the rotor 1 to direct the flow of air upward and outward from the vehicle 15b, preventing the formation of a drag-producing "pocket" of air behind the vehicle. An open area 11 below the actual spoiler (or "lip") 13 at the rear of the unit 9 helps prevent a build-up of air pressure around the spinning Finley rotor 1 and also allows wind blowing toward the rear of the vehicle 15b to turn the Finley rotor 1 while the vehicle is parked. The ends of the spoiler unit 14 support the actual spoiler (or "lip") 13 and hide the generators/alternators 5 (not shown in FIG. 6) attached to the short rods 4 at the ends of the Finley rotor 1. Again, the generators/alternators 5 must be securely attached to the vehicle 15b and able to endure tremendous torque resulting from the spinning of the Finley rotor 1. Some vehicles may require reinforcement in the area where the generators/alternators 5 are secured. The spoiler unit 9 can be made out of customary low-weight man-made materials as long as the actual spoiler (or "lip") 13 will not warp and rub against the Finley rotor 1 after regular prolonged exposure to high wind/vehicle speeds, sunlight and weather.

While certain preferred embodiments of the present invention have been disclosed in detail, it is to be understood that various modifications in its structure may be adopted without departing from the spirit of the invention or the scope of the following claims:

I claim:

1. A horizontal-axis fixed-blade rotor with several horizontal blades running the length of the axis and extending symmetrically no more than a few inches from the axis, each blade being curved in the same direction, and the rotor being attached by short rods at both ends to electrical generators, embedded within an air dam attached to the lower front end of a motor vehicle to prevent the formation of an air pocket beneath the vehicle, with a portion of the rotor exposed to the flow of air current or wind through a small horizontal vent at the bottom of which a gently sloping ramp directs the air current or wind to cool the engine or ventilate the passenger compartment.

2. A horizontal-axis fixed-blade rotor with several horizontal blades running the length of the axis and extending symmetrically no more than a few inches from the axis, each blade being curved in the same direction, and the rotor being attached by short rods at both ends to electrical generators, embedded within a spoiler unit attached to the upper rear end of a motor vehicle, about one-third or one-fourth of the rotor being exposed to the flow of wind across the small, gently sloping deflector plate in front of the rotor (to guide and lift the flow of air current into the rotor's blades) and the spoiler located behind the rotor (to break up post-rotor turbulence and prevent the formation of a pocket of air behind the vehicle), and an opening at the lower rear of the spoiler unit exposing about one-third or one-fourth of the rotor in order to prevent the formation of a vacuum around the rotor and to allow wind blowing toward the rear of the vehicle to turn the rotor when the vehicle is parked or driving very slowly.

3. An integral air dam and rotor unit in accordance with claim 1 and an integral spoiler and rotor unit in accordance with claim 2 attached to a motor vehicle and operating together to generate electricity to recharge the vehicle's battery or batteries and to reduce the vehicle's overall drag, thereby improving the driveable distance and/or mileage of the motor vehicle.

* * * * *